United States Patent
Heidan et al.

(10) Patent No.: US 9,216,631 B2
(45) Date of Patent: Dec. 22, 2015

(54) ROOF SYSTEM FOR A MOTOR VEHICLE

(71) Applicants: Michael Heidan, Stuttgart (DE); Hartmut Eberst, Schwaebisch Gmuend (DE)

(72) Inventors: Michael Heidan, Stuttgart (DE); Hartmut Eberst, Schwaebisch Gmuend (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/251,020

(22) Filed: Apr. 11, 2014

(65) Prior Publication Data
US 2014/0306492 A1    Oct. 16, 2014

(30) Foreign Application Priority Data

Apr. 12, 2013 (DE) .......................... 10 2013 206 521

(51) Int. Cl.
| | |
|---|---|
| *B60J 7/057* | (2006.01) |
| *B60J 7/02* | (2006.01) |
| *B60J 7/043* | (2006.01) |

(52) U.S. Cl.
CPC ............. *B60J 7/024* (2013.01); *B60J 7/0435* (2013.01)

(58) Field of Classification Search
CPC ............................... B60J 7/024; B60J 7/0435
USPC ............................................ 296/216.01–224
See application file for complete search history.

(56) References Cited

U.S. PATENT DOCUMENTS

| | | | |
|---|---|---|---|
| 6,382,713 B2 * | 5/2002 | Farber ....................... | 296/220.01 |
| 6,890,025 B2 | 5/2005 | Hanke | |
| 2004/0090090 A1 | 5/2004 | Hanke | |
| 2004/0130187 A1 * | 7/2004 | Friedrich et al. .......... | 296/216.08 |
| 2011/0285181 A1 * | 11/2011 | Manders ..................... | 296/223 |

FOREIGN PATENT DOCUMENTS

| | | |
|---|---|---|
| DE | 101 44 756 A1 | 4/2003 |
| DE | 10 2006 021 816 B3 | 10/2007 |
| DE | 10 2008 017 526 B3 | 9/2009 |
| DE | 10 2010 018 457 A1 | 10/2011 |

OTHER PUBLICATIONS

Office Action of the German Patent Office issued in German Application No. 10 2013 206 521.3 dated Feb. 10, 2014 (5 pages).

* cited by examiner

*Primary Examiner* — Dennis H Pedder
(74) *Attorney, Agent, or Firm* — Flynn, Thiel, Boutell & Tanis, P.C.

(57) ABSTRACT

A roof system for a motor vehicle with a roof opening and a movable roof part for opening up and closing the roof opening, the roof part being assigned a web guide on opposite sides, the web guide permitting a longitudinal displacement and a vertical shifting of the roof part. Each web guide is assigned a respective slider unit which has a carrier structure which is tiltable in the manner of a rocker and on both sides of a rocker axis, as seen in the longitudinal direction, has sliding sections which receive the web guide.
The two sliding sections are formed by a common sliding body which extends in the longitudinal direction beyond the rocker axis and is of elastically flexible design.

22 Claims, 4 Drawing Sheets

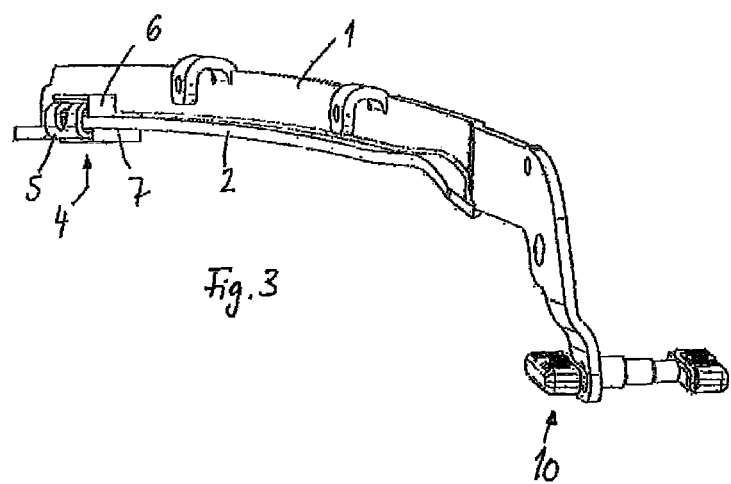
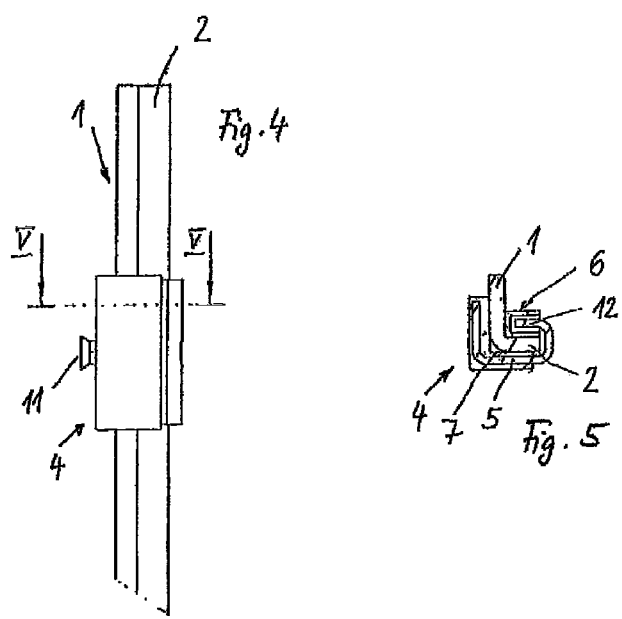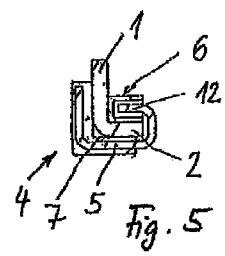

ROOF SYSTEM FOR A MOTOR VEHICLE

CROSS-REFERENCE TO RELATED APPLICATION

This application claims the priority of the German patent application DE 10 2013 206 521.3, the disclosure of which is hereby incorporated into this application.

FIELD OF THE INVENTION

The invention relates to a roof system for a motor vehicle with a roof opening and with a movable roof part for opening up and closing the roof opening, the roof part being assigned a web guide on both opposite sides, said web guide permitting a longitudinal displacement and a vertical shifting of the roof part, and each web guide being assigned a respective slider unit which has a carrier structure which is tiltable in the manner of a rocker and on both sides of a rocker axis—as seen in the longitudinal direction—has sliding sections which receive the web guide.

BACKGROUND OF THE INVENTION

A roof system of this type is known from DE 10 2008 017 526, B3. The known roof system is provided for a passenger vehicle and has a roof opening which can be closed by a liftable and longitudinally movable cover. The cover is provided on both of the opposite longitudinal sides thereof with a web guide which is fastened to the cover and is mounted in a respective slider unit. The slider unit is coupled to a deployment lever which is mounted pivotably on the roof side. The slider unit comprises two rotary sliders which are spaced apart from each other, each have a guide slot for receiving the web guide and are matched in the rotational position thereof to a curved profile of the web guide.

SUMMARY OF THE INVENTION

It is the object of the invention to provide a roof system of the type mentioned at the beginning which permits improved mounting and guidance of the movable roof part.

This object is achieved in that the two sliding sections are formed by a common sliding body which extends in the longitudinal direction beyond the rocker axis and is of elastically flexible design. The elastically flexible design of the sliding body permits guidance of the sliding body both in rectilinear sections of the web guide and in curved sections of the web guide. The sliding body is preferably formed by a flexible sliding casing supported on the inside by an elastic core. The sliding body is additionally mounted rotatably about the rocker axis of the carrier structure, in particular a cage, and therefore good sliding guidance of the web guide and good guidance of the sliding body in curved sections or sections of curvature of the web guide are ensured. The solution according to the invention is suitable in a particularly advantageous manner for roof systems in passenger vehicles, wherein roof systems of this type have at least one movable roof part both displaceable in the longitudinal direction of the roof system and also deployable by being liftable.

In a refinement of the invention, a sliding block is provided opposite the sliding body, the sliding block mutually flanking the web guide with respect to the sliding body. The web guide is therefore mounted between the sliding body and the sliding block, wherein the sliding body bears on one side of the web guide and the sliding block bears on the other side of the web guide. The opposite web guide of the roof part is flanked in an analogous manner by a sliding body and a sliding block.

In an advantageous refinement, the sliding block is of spherical design on the sliding surface thereof which faces the web guide. This means that the sliding block does not have a flat sliding surface but, on the contrary, has a curved sliding surface which does not bear over the entire length thereof against the web guide, but rather, on the contrary, only bears thereagainst in the region of the spherical configuration.

In a further refinement of the invention, the sliding body and the sliding block are composed of plastic. Suitable plastics are plastics materials which are provided with good sliding properties and are highly resistant to wear.

In a further refinement of the invention, a core of the sliding body is composed of an elastomer material. The core supports a sliding casing of the sliding body, wherein the sliding casing without the supporting core is of flexible design. The sliding casing is produced from the wear-resistant plastic with good sliding properties, as has previously been described. The elastomer core is supported in such a manner that elastic flexibility is nevertheless ensured in order, even in curved regions and regions of curvature of the web guide, to achieve reliable sliding guidance without an increase in the friction between the sliding unit and web guide.

In a further refinement of the invention, the sliding body and the sliding block are held on a cage of the slider unit, said cage forming the carrier structure and being mounted rotatably about the rocker axis. Said cage bears the components composed of plastic, namely the sliding body and the sliding block, wherein, in particular, the sliding body can be in multipart form consisting of the core already described and the sliding casing surrounding said core.

In a further refinement of the invention, the cage has at least one supporting web onto which the sliding body is plugged. This is a simple and functionally reliable support.

In a further refinement of the invention, two supporting webs which are spaced apart from each other in the longitudinal direction, onto which the sliding body is plugged and which form supporting regions of the two sliding sections of the sliding body, are provided. The sliding body is movable in an elastically flexible manner relative to said two supporting regions.

In a further refinement of the invention, the sliding block surrounds a base region of the cage. The cage is preferably produced from metal, and the sliding block surrounds the base region of the cage by means of insert molding. The cage is preferably placed here into an injection molding die in which the sliding block is produced from a corresponding thermoplastic material. A thermoplastic elastomer can also be provided as a suitable plastics material.

In a further refinement of the invention, the cage comprises a rotary bearing for the rotatable mounting of the cage about the rocker axis, said rotary bearing being fastened to a pivotable adjustment lever of a deployment mechanism. As a result, the cage and the sliding body and also the sliding block are connected on each side of the roof part to corresponding movement kinematics in order to permit the displacement and raising or lowering of the roof part.

BRIEF DESCRIPTION OF THE DRAWINGS

Further advantages and features of the invention emerge from the claims and from the description below of a preferred exemplary embodiment of the invention, which is illustrated with reference to the drawings, in which:

FIG. 3 shows, in a perspective illustration, the web guide for the movable roof part of the roof system according to FIGS. 1 and 2, FIG. 4 shows a top view of a subsection of the web guide in the region of a slider unit, FIG. 5 shows a section through the slider unit according to FIG. 4 along the section line IV-IV in FIG. 4.

DETAILED DESCRIPTION

A roof system for a passenger vehicle is fastened in an opening in a vehicle roof of the passenger vehicle. The roof system has a dimensionally stable frame which is connected to corresponding body parts of the vehicle roof. The frame of the roof system borders a roof opening which can be closed or can be opened up by at least one movable roof part. If the roof opening is opened up, sun and fresh air can stream through the roof opening into a vehicle interior of the passenger vehicle. The movable roof part is designed as a tilt and slide roof part which can carry out a displacement movement in the longitudinal direction of the vehicle in relation to the frame of the roof system and a lifting movement in the vertical direction of the vehicle. The lifting movement is necessary in order, during an opening operation, to be able to raise the roof part beyond a stationary roof section and to be able to push said roof part over the latter.

The movable roof part is of both dimensionally stable design and is preferably composed of glass. The opposite sides of the movable roof part are guided in the longitudinal direction and in the lifting direction via a respective guide mechanism. The two guide mechanisms are configured in a functionally identical manner to each other on the opposite sides of the roof part. Each guide mechanism is arranged in each case in the region of one longitudinal side of the frame of the roof system. The two guide mechanisms are assigned an electric drive unit, said drive units being operatively connected via flexible drive transmission units such as, in particular flexible shafts, to the guide mechanisms.

Figure 1:
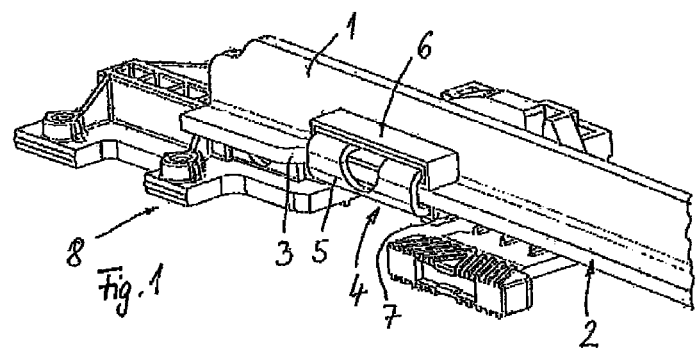
FIG. 1 shows a detail of an embodiment of a roof system according to the invention in the region of a web guide of a movable roof part.
Figure 2:
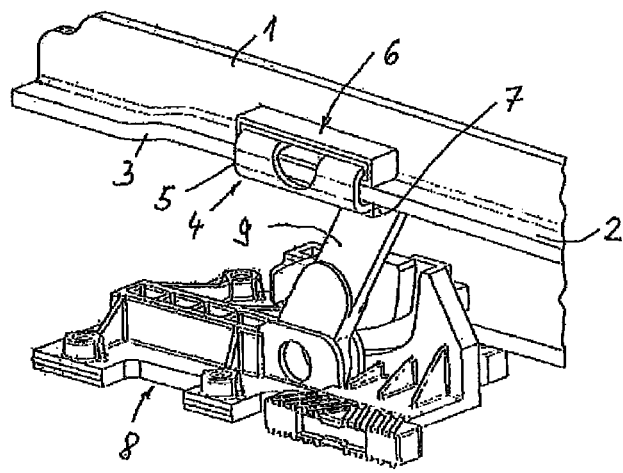
FIG. 2 shows a detail according to FIG. 1 in an upwardly deployed functional position of the web guide.
Figure 6:
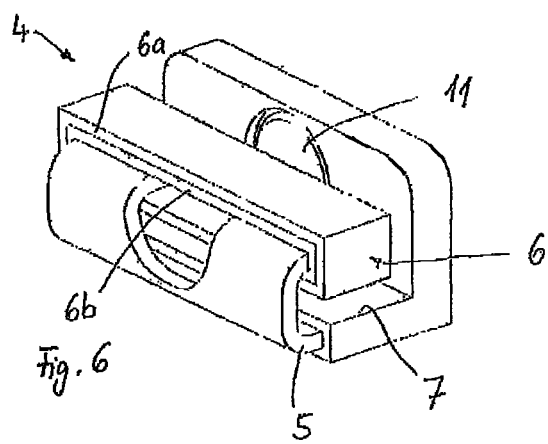
FIG. 6 shows, in an enlarged perspective illustration, the slider unit according to FIGS. 4 and 5.

On the opposite sides of the roof part, the two guide mechanisms are in each case assigned, according to FIGS. 1 to 3, a web guide 1 which is fixedly connected to a respective side edge of the movable roof part. Owing to the fixed connection of each of the two web guides 1 to the corresponding side edge region of the movable roof part, the movable roof part and the two web guides 1 on the opposite side edge regions of the movable roof part form a dimensionally stable roof unit which carries out corresponding movements brought about by the guide mechanism. A guide of the movable roof unit, i.e. of the movable roof part and of the web guides 1 thereof, is described below with reference to a web guide 1 on one side of the movable roof part. The description applies in the same manner to the web guide on the opposite side of the movable roof part, and therefore, for said web guide reference is made to the description and illustration of the web guide 1 according to FIGS. 1 to 7 in order to avoid repetition.

According to FIG. 3, the web guide 1 which is fixedly connected to the movable roof part by screw connections is mounted displaceably in the longitudinal direction of the roof system on a guide carriage 10 in a front bearing region—as seen in the direction of travel of the passenger vehicle. In addition, the web guide 1 is mounted pivotably in the region of said guide carriage 10 about a pivot axis extending in the transverse direction of the vehicle and therefore in the transverse direction of the roof system in order to be able to carry out deployment operations of the movable roof unit upward.

The web guide 1 has a guide web 2 protruding approximately horizontally, and therefore an approximately L-shaped cross-sectional profile (see FIG. 5) is produced for the web guide 1. The guide web 2 has rectilinear guide sections and at least one guide section 3 curved in an S-shaped manner. The guide section 3 which is curved in an S-shaped manner defines a transition between two rectilinear guide sections which are offset with respect to each other in the vertical direction of the roof system.

In order to enable a defined forced guidance of the web guide 1 in the region of the guide web 2, the web guide is assigned a slider unit 4 which is described in more detail below with reference to FIGS. 1 to 7. The slider unit 4 is mounted rotatably on a deployment lever 9 of the guide mechanism about an axis of rotation D (FIG. 7) extending in the transverse direction of the vehicle and therefore in the transverse direction of the roof system. The deployment lever 9 is mounted pivotably on a bearing carriage 8 about a pivot axis parallel to the axis of rotation D. The deployment lever 9 serves to transfer the web guide 1 and therefore the movable roof part from a lower rest position (FIG. 1) into an upper lifting position (FIG. 2) in order thereby to be able to slide the movable roof part beyond a fixed roof section during a displacement movement to the rear.

The slider unit 4 has a cage 5 composed of metal and has an open cross-sectional profile in the longitudinal direction of the roof system. The cage 5 is also open upward in the vertical direction of the roof system. As a result, the web guide 1 can be guided by the guide web 2 thereof in the longitudinal direction through the slider unit 4, wherein a vertically upwardly protruding carrier section of the web guide 1 can protrude upward out of the cage 5. The cage 5 has, coaxially with respect to the axis of rotation D, in a lateral rotational limb a circular passage bore through which a rotary bearing 11 can be guided for the rotatable connection to the deployment lever 9 and can be connected to the cage 5. The retaining limb of the cage 5 merges as a single part into a flat base region 7 oriented horizontally during the operation of the slider unit 4. Two supporting webs 12 are provided opposite the retaining limb, said supporting webs being curved upward in the manner of hooks and horizontally inward toward the retaining limb and being spaced apart from each other in a mirror-symmetrical manner with respect to the axis of rotation D and having a recess therebetween which permits a knob-shaped rotary bearing part of the rotary bearing 11 to be installed and removed. The two supporting webs 12 have a flat, rectangular cross-sectional profile, with respect to an orientation of the cross section in a vertical longitudinal plane of the roof system.

The base region and the retaining limb of the cage 5 are surrounded by a plastics sheathing 13 which, on the upper side thereof at least in the base region forms a wear-resistant sliding surface. The plastics sheathing 13 is connected to the cage 5 in a form-fitting and integrally-bonded manner by insert molding.

Figure 7:
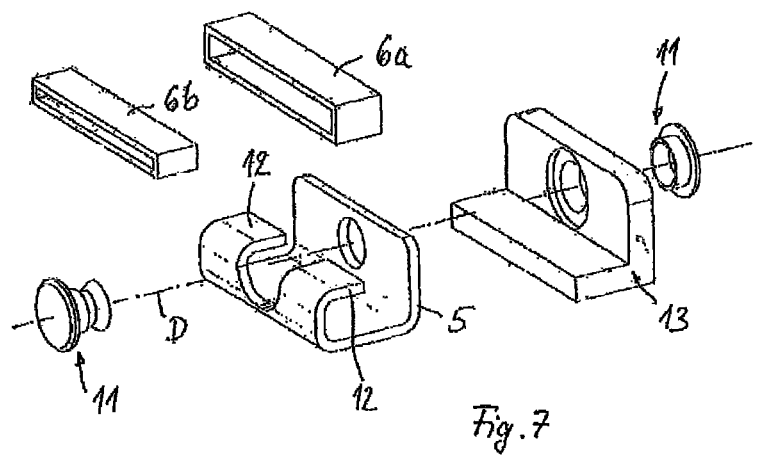
FIG. 7 shows the slider unit according to FIG. 6 in an isometric exploded illustration.
Figure 7A:
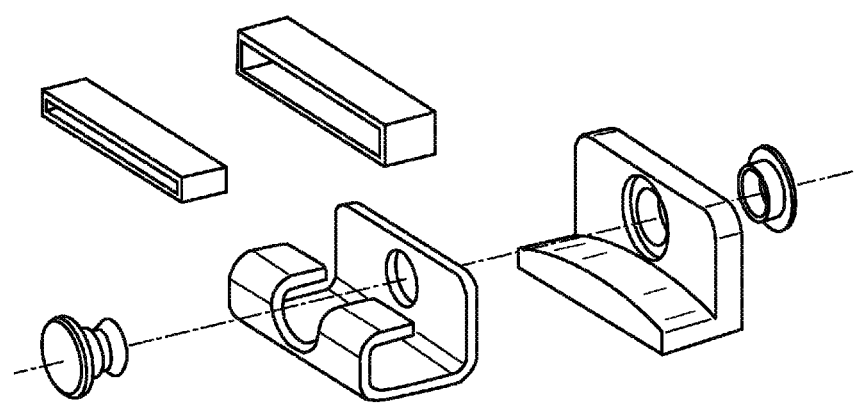
FIG. 7A shows another embodiment of the slider unit according to FIG. 6 in an isometric exploded illustration.

A sliding surface forming the upper side of the base region of the plastics sheathing 13 is of flat design in the illustration according to FIG. 7. In a preferred embodiment of the invention as illustrated in FIG. 7A, said sliding surface is of spherical design by forming a convex curvature which, as seen in the longitudinal direction of the roof system, forms an apex point level with the axis of rotation D. Furthermore, said preferred embodiment is formed identically to the slider unit according to FIGS. 6 and 7. The plastics sheathing 13 with its sliding surface forms, in conjunction with the base region of the cage 5, a sliding block within the context of the invention.

At a distance above the sliding surface of the plastics sheathing 13, the slider unit 4 has a sliding body 6 which is formed in two parts from an inner core 6b, and an outer sliding casing 6a. The core 6b, is produced from an elastomer material and can be pushed horizontally onto the supporting webs 12. The sliding casing 6a, encloses the core 6b, on the outside in a formfitting manner. The sliding casing 6a, is formed by an elastically flexible annular body with a rectangular cross section, which is produced from a thermoplastics material with good sliding properties and high wear resistance. The sliding casing 6a, can be provided with longitudinal profilings which run in the longitudinal direction of the roof system, in order to reduce sliding friction for the guide web 2. The sliding surface of the sliding block in the region of the plastics sheathing 13 can also be provided with longitudinal profilings in order to reduce the sliding friction relative to the guide web 2.

The core 6b, forms the elastically flexible, inside deformation and supporting function for the sliding casing 6a, which surrounds the core 6b, on the outside. The sliding casing 6a, forms a four-cornered ring which borders a cavity open toward opposite sides, Said cavity is matched with the external dimensions of the core 6b, in order to be able to permit plugging onto the core 6b, in a form-fitting manner in the transverse direction of the roof system. The sliding casing 6a, is completely open only on the side on which the sliding casing 6a, is plugged axially onto the core 6b. An opposite end side can be partially or even completely closed in order to form a stop when the sliding casing 6a, is plugged onto the core 6b.

It can be seen with reference to FIG. 5 how the slider unit 4 encloses the web guide 1 and in particular the guide web 2 in the fitted state ready for operation and thus defines a forced guide for the web guide 1. The elastic flexibility of the sliding body 6a, 6b, is selected in such a manner that the web guide 1 with the guide web 2 thereof can also be guided in the region of a curved guide section, in particular in the region of the S-shaped guide section 3, without a disadvantageous increase in the sliding friction arising in the region of curved guide sections of this type. The slider unit 4 is guided by the rotatability in the manner of a rocker about an axis of rotation D relative to the deployment lever 9 in the region of the guide section 3 which is curved in an S-shaped manner. The elastic flexibility of the sliding body 6 in the manner of a sliding cushion in conjunction with an elastic flexibility of the sliding surface of the sliding block formed by the plastics sheathing 13 and/or of a spherical design of said sliding surface ensures reliable sliding guidance even in the region of the guide section 3 curved in an S-shaped manner, without a disadvantageous increase in the sliding friction as far as jamming of the slider unit 4 relative to the guide web 2 occurring in said region.

The invention claimed is:

1. A roof system for a motor vehicle with a roof opening and with a movable roof part for opening up and closing the roof opening, the roof part being assigned a web guide on both opposite sides, said web guide permitting a longitudinal displacement and a vertical shifting of the roof part, and each web guide being assigned a respective slider unit which has a carrier structure which is tiltable in the manner of a rocker and on both sides of a rocker axis—as seen in the longitudinal direction—has sliding sections which receive the web guide, wherein the two sliding sections are formed by a common sliding body which extends in the longitudinal direction beyond the rocker axis and is of elastically flexible design, and wherein the carrier structure is non-circular.

2. The roof system as claimed in claim 1, wherein a sliding block is provided opposite the sliding body, said sliding block mutually flanking the web guide with respect to the sliding body.

3. The roof system as claimed in claim 2, wherein the sliding block is of spherical design on the sliding surface thereof which faces the web guide.

4. The roof system as claimed in claim 2, wherein the sliding body and the sliding block are composed of plastic.

5. The roof system as claimed in claim 1, wherein a core of the sliding body is composed of an elastomer material.

6. The roof system as claimed in claim 5, wherein the core is inserted into a sliding casing of the sliding body.

7. The roof system as claimed in claim 2, wherein the sliding body and the sliding block are held on a cage of the slider unit, said cage forming the carrier structure and being mounted rotatably about the rocker axis.

8. The roof system as claimed in claim 7, wherein the cage has at least one supporting web onto which the sliding body is plugged.

9. The roof system as claimed in claim 8, wherein two supporting webs which are spaced apart from each other in the longitudinal direction, onto which the sliding body is plugged and which form supporting regions of the two sliding sections of the sliding body, are provided.

10. The roof system as claimed in claim 2, wherein the sliding block surrounds a base region of a cage of the carrier structure.

11. The roof system as claimed in claim 1, wherein a cage of the carrier structure is produced from metal, and wherein a sliding block surrounds a base region of the cage by insert molding.

12. The roof system as claimed in claim 10, wherein the cage comprises a rotary bearing for the rotatable mounting of the cage about the rocker axis, said rotary bearing being fastened to a pivotable deployment lever of a guide mechanism.

13. The roof system as claimed in claim 7, wherein the sliding block surrounds a base region of the cage.

14. The roof system as claimed in claim 13, wherein the cage is produced from metal, and wherein the sliding block surrounds the base region of the cage by means of insert molding.

15. A roof system for a motor vehicle with a roof opening, the roof system comprising:
a movable roof part for opening up and closing the roof opening;
a pair of web guides, the web guides being on opposite sides of the movable roof part, the web guides permitting a longitudinal displacement and a vertical shifting of the movable roof part, each of the web guides including a guide web having a top surface and a bottom surface; and
a pair of slider units, each of the slider units sliding on one of the web guides, each of the slider units being tiltable about a rocker axis, each slider unit including a slot for receiving the guide web of one of the web guides therein for allowing the guide web to slide through the slot in a sliding direction;

each of the slider units includes a sliding section located above the top surface of the guide web as the guide web slides within the slider units;

the sliding section for each of the slider units being a single common body located above the rocker axis and extending in a longitudinal direction, the single common body extending in front of and behind of a plane that is both perpendicular to the sliding direction and extending through the rocker axis; and the sliding section for each of the slider units being elastically flexible;

wherein the common body is non-circular.

16. The roof system as claimed in claim 15, wherein each of the slider units further include a sliding block opposite the sliding section, with the web guide being located between the sliding block and the sliding section.

17. The roof system as claimed in claim 16, wherein the sliding section and the sliding block are composed of plastic.

18. The roof system as claimed in claim 16, wherein each of the slider units further comprises a cage, the cage having the sliding section thereon.

19. The roof system as claimed in claim 18, wherein the cage includes two supporting webs which are spaced apart from each other in the longitudinal direction, onto which the sliding section is fitted upon.

20. The roof system as claimed in claim 18, wherein the sliding block surrounds a base region of the cage.

21. The roof system as claimed in claim 20, wherein the cage is produced from metal.

22. The roof system as claimed in claim 19, wherein the cage comprises a rotary bearing for rotatable mounting of the cage about the rocker axis, the rotary bearing being fastened to a pivotable deployment lever of a guide mechanism.

* * * * *